US010281585B2

(12) United States Patent
Digrazia (10) Patent No.: US 10,281,585 B2
(45) Date of Patent: May 7, 2019

(54) METHOD FOR THE ACQUISITION OF A GEO (GEOSTATIONARY EARTH ORBIT) SATELLITE AND CORRESPONDING RECEIVER

(71) Applicant: STMICROELECTRONICS S.R.L., Agrate Brianza (IT)

(72) Inventor: Domenico Digrazia, Cesa (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 303 days.

(21) Appl. No.: 15/163,489

(22) Filed: May 24, 2016

(65) Prior Publication Data

US 2017/0212245 A1    Jul. 27, 2017

(30) Foreign Application Priority Data

Dec. 7, 2015  (IT) .......................... 102015000080908

(51) Int. Cl.
*G01S 19/24* (2010.01)
*G01S 19/30* (2010.01)
*G01S 19/34* (2010.01)

(52) U.S. Cl.
CPC .............. *G01S 19/30* (2013.01); *G01S 19/24* (2013.01); *G01S 19/243* (2013.01); *G01S 19/34* (2013.01)

(58) Field of Classification Search
CPC ........ G01S 19/24; G01S 19/30; G01S 19/243; G01S 19/34
USPC ..................................................... 342/357.69
See application file for complete search history.

(56) References Cited

U.S. PATENT DOCUMENTS 8,111,646 B1 * 2/2012 Chang .................. H04B 7/0413
370/316
2007/0013583 A1    1/2007 Wang et al.
2012/0293369 A1   11/2012 Liu et al.
(Continued)

FOREIGN PATENT DOCUMENTS

CN       102707295 A    10/2012
CN       104459734 A     3/2015

OTHER PUBLICATIONS

Fairhurst et al., "New Systems, New Signals, New Positions—Providing BeiDou Integration," *Proceedings of the 26th International Technical Meeting of the ION Satellite Division*, ION GNSS+ 2013, Nashville, TN, USA, Sep. 16-20, 2013, pp. 3214-3220.

(Continued)

*Primary Examiner* — Dao L Phan
(74) *Attorney, Agent, or Firm* — Seed IP Law Group LLP (57) ABSTRACT

A Geostationary Earth Orbit (GEO) satellite belonging to a constellation of satellites of a BeiDou navigation system is acquired at a GNSS receiver. Conducting the acquisition includes finding the edge of a data bit in a signal carrying a data stream of a given satellite in order to start a locked tracking phase and demodulating the data stream of the GEO satellite. Detecting the edge of the data bit includes performing, at the GNSS receiver, a coherent power accumulation over a constant data cycle, starting from two respective possible initial positions in the sequence of data. Detecting the edge of the data bit also includes computing a tracking ratio parameter as the ratio of the two coherent power accumulations multiplied by a constant value.

20 Claims, 4 Drawing Sheets

(56) References Cited

U.S. PATENT DOCUMENTS

2014/0219124 A1* 8/2014 Chang ................ H04B 7/0413
370/252

OTHER PUBLICATIONS

Search Report, dated Jul. 14, 2016, for Italian Application No. UB20156897, 2 pages.

* cited by examiner

METHOD FOR THE ACQUISITION OF A GEO (GEOSTATIONARY EARTH ORBIT) SATELLITE AND CORRESPONDING RECEIVER

BACKGROUND

Technical Field

The present description relates to techniques for the acquisition and tracking of a GEO (Geostationary Earth Orbit) satellite belonging to a constellation of satellites of a BeiDou navigation system at a Global Navigation Satellite System (GNSS) receiver, including detecting in a signal carrying a data stream of a given GEO satellite the edge of a data bit in order to synchronize the GEO satellite at the start of a locked tracking phase and demodulate said data stream of the GEO satellite.

Various embodiments may apply, e.g., to GNSS receiver, in particular according to a STA8090 platform, comprising a digital signal processing module implementing the method through a finite state machine.

Description of the Related Art

The BeiDou Navigation satellite System (BDS) space constellation consists of 27 MEO (Medium Earth Orbit) satellites and 5 GEO (Geostationary Earth Orbit) satellites.

The signals issued by the MEO satellites share many similarities with GPS signal, starting from the common data bit length (20 ms). The MEO signals include a further feature in that, on top of the data bit transmission a direct RFI (Radio Frequency Interference) protection mechanism achieved by the presence of a NH (Neumann-Hoffman) secondary code that modulates the data and directly reduces the observable carrier to noise density $C/N_0$ when a continuous wave is being tracked instead of the satellite itself. This happens because the natural absence of the NH secondary code modulation implies a direct failure of wipe off management at the receiver side when a continuous wave enters the MEO tracking loop.

On the contrary, a GEO satellite issues a signal which is faster, 2 ms data bit length, and not protected at all against RFI and inter system cross correlation. Thus it is more difficult to correctly perform bit edge detection at the beginning of the acquisition to start the tracking phase and reject RFI when the tracking is already established.

The subject matter discussed in the Background section is not necessarily prior art and should not be assumed to be prior art merely as a result of its discussion in the Background section. Along these lines, the recognition of one or more problems in the prior art discussed in the Background section and the subject matter associated therewith should not be treated as prior art unless expressly stated to be prior art. Instead, the discussion in the Background section encompassing one or more recognized problems in the prior art should be treated as part of the inventor's approach to the particular problem, which in and of itself may also be inventive.

BRIEF SUMMARY

An object of one or more embodiments is to provide a method for the acquisition of a GEO (Geostationary Earth Orbit) satellite which solves the drawbacks of the prior art.

According to one or more embodiments, that object is achieved thanks to a method having the characteristics specified in claim 1. One or more embodiments may refer to a corresponding system.

The claims form an integral part of the technical teaching provided herein in relation to the various embodiments.

According to the solution described herein, the method includes performing at the receiver a coherent power accumulation over time length corresponding to a constant data cycle, starting from two respective possible initial positions in the sequence of data and computing a tracking ratio parameter as the ratio of said two coherent power accumulations multiplied by a constant value.

In variant embodiments, the method includes comparing the tracking ratio to a greater reference value, greater than said constant value, and to a smaller reference value, smaller than said constant value, and in case the tracking ratio is greater than the greater reference value the data bit edge is considered to be placed at a time indicated by even milliseconds, while in the case the tracking ratio is smaller than the smaller reference value, the data bit edge is considered to be placed at odd milliseconds.

In variant embodiments, the method includes checking if the value of said tracking ratio parameter falls within the range defined by the two reference values and dropping the satellite in the negative.

In variant embodiments, the method includes preliminary verifying if a data bit edge prediction is available for the GEO satellite at the start up of the receiver, and in the affirmative setting the coherent power accumulations to accumulate starting on the predicted bit boundary and the following millisecond respectively.

In variant embodiments, the method includes comparing or checking the tracking ratio parameter after a given synchronization timeout representing a time to lock the GEO satellite.

In variant embodiments, the method includes preliminarily verifying if a data bit edge prediction is available for the GEO satellite at the start up of the receiver, and in the affirmative setting the coherent power accumulations to accumulate starting on the predicted bit boundary and the following millisecond respectively.

In variant embodiments, the method includes a step of aligned tracking including verifying if the tracking ratio parameter is smaller than the smaller reference value and, in the positive, performing a step of alignment swap including swapping the phase assumed as bit boundary and checking if a gain in the reported carrier to noise density takes place after such swap of the bit edge position.

In variant embodiments, the method includes performing an operation of RFI removal, checking if the tracking ratio falls within range defined by a RFI high threshold and a RFI low threshold, said range falling within said greater reference value, greater than said constant value, and to a smaller reference value, smaller than said constant value, and in the affirmative performing a satellite exclusion.

In variant embodiments, the method includes that the constant value is preferably two times the data bit rate, in particular 1000.

In various embodiments, the solution described herein is also directed to a GNSS receiver for the acquisition of a GEO (Geostationary Earth Orbit) satellite belonging to a constellation of satellites of a BeiDou navigation system, characterized in a system that implements the method according any of the previous embodiments

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. One or more embodiments are described hereinafter with reference to the accompanying drawings. The solution will now be described purely by way of a non-limiting example with reference to the annexed drawings, in which.

DETAILED DESCRIPTION

The ensuing description illustrates various specific details aimed at an in-depth understanding of the embodiments. The embodiments may be implemented without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is meant to indicate that a particular configuration, structure, or characteristic described in relation to the embodiment is comprised in at least one embodiment. Likewise, phrases such as "in an embodiment" or "in one embodiment", that may be present in various points of the present description, do not necessarily refer to the one and the same embodiment. Furthermore, particular conformations, structures, or characteristics can be combined appropriately in one or more embodiments.

The references used herein are intended merely for convenience and hence do not define the sphere of protection or the scope of the embodiments.

In order to describe the solution now the meaning of some quantities relevant for the solution will be preliminarily described.

The composite signal r(t) received by a Global Navigation Satellite System (GNSS) receiver, at BeiDou L1 frequency, $$r(t) = \sum_{i \in S} S_i(t) + n(t) \quad (1)$$

where $s_i(t)$ indicates a signal contribution of a i-th satellite of a constellation S of satellites, in particular a constellation of geosatellites of a BeiDou system, and n(t) the noise entering the receiver.

The i-th signal contribution $s_i(t)$ can be rewritten as $$s_i(t) = A_i c_i(t-t_i) d_i(t-t_i)[\cos(2\pi f_1 + \Delta f_i)t + \theta_i)] \quad (2)$$

where $A_i = \sqrt{2P_i}$ indicates the amplitude of the i-th signal, $P_i$ indicates the power, $c_1(t)$, $d_i(t)$ indicate respectively the C/A (Clear/Acquisition) pulse and the data bit value at the time t, $f_1$ is the frequency of the L1 BeiDou carrier, $\Delta f_i$ the frequency shift given by the sum of the i-th satellite Doppler and the user motion, $\theta_i$ the carrier phase offset and $t_i$ models the overall propagation delay.

As mentioned, for MEO satellites $d_i$ represents the modulation of the data bit, which is 20 ms long, by the NH secondary code and can vary according to the D1 navigation message format.

For GEO satellites the data bit $d_i$ is instead constant across 2 consecutive milliseconds and can vary in 0/1 according to the D2 navigation message format.

In order to start a locked tracking phase and demodulate data stream of GEO satellites the boundary of the data bit $d_i$ has to be found, after a valid point has been provided by the acquisition engine machine.

Various embodiments may apply to a GNSS receiver, in particular according to a digital signal processing module implementing the method through a finite state machine.

Figure 1:
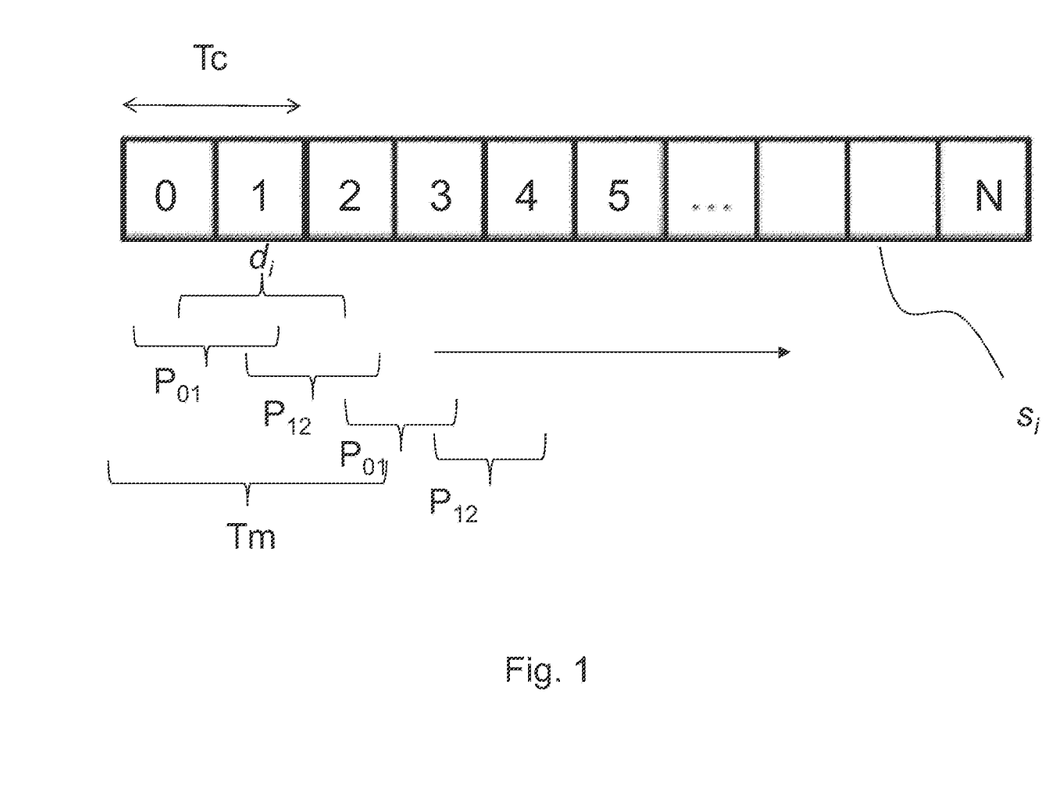
FIG. 1 is a diagram showing a data stream of a satellite signal.

In FIG. 1 it is shown a data $d_i$ of a D2 navigation signal $s_i$ transmitted by a GEO satellite. The sequence of cells in FIG. 1 designate a plurality of tracking positions, 0, 1, . . . N, each 1 millisecond in length. The data bit cycle $T_c$ is two milliseconds, as mentioned. If the data di is two ($T_c$) milliseconds long and constant, there are two possible initial tracking positions for the data $d_i$ namely I01, from 0 to 1 milliseconds, and I12, from 1 to 2 milliseconds as indicated in FIG. 1. In other words, I01 and I02 are two tracking positions with a given offset of half the bit cycle $T_c$, i.e., 1 milliseconds.

Coherent power accumulations P01, P12, over 2 consecutive milliseconds, i.e., the data bit cycle $T_c$ starting from such two respective possible initial positions I01 and I12, can be then formed, using a measure time $T_m$ of 3 consecutive milliseconds, which encompasses both I01 and I12.

Coherent power accumulations P01, P12 are also continuously filtered in order to have that their value tend to the respective average $\overline{P01}$ and $\overline{P12}$. This filtering operation, which can be performed over a period of several seconds, e.g., 2-3 seconds, is intended to stabilize the instant power to obtain a more reliable value of such powers and of the parameter obtained on the basis of such powers, described in the following.

In order to qualify the tracking of the i-th GEO satellite, a tracking ratio XGS is introduced:

$$XGS = 1000 * \overline{P01}/\overline{P12} \quad (2)$$

as the ratio of the coherent power accumulation $\overline{P01}$ over the first position I01 and the coherent power accumulation $\overline{P12}$ over the second initial position I02, in particular multiplied by a constant factor, which is preferably chosen as the value 1000, in order to have a granularity of tracking ratio XGS in thousandths.

Since the ratio of the coherent power accumulations varies between 2 (data $d_i$ starts exactly at the beginning of position I01) and 0.5 (data $d_i$ starts exactly at the beginning of position I12), the tracking ratio XGS will consequently tend to 2000 or 500 value according to the bit boundary position, in the hypothesis a random bit stream is applied. The averaging necessity also rises from the fact that the tracking ratio XGS tends to 2000 or 500 value only if there is a consistent random bit stream, with changing bits in the observation interval.

Such tracking ratio XGS is thus used for data bit initial identification. Data bit boundary detection can be executed checking the value of the tracking ratio XGS after a synchronization timeout TTLG, i.e., a time to lock the geosatellite, of a given number of milliseconds has elapsed, using two reference values XGL0 and XGL1 which are respectively greater and smaller than the constant factor of equation (2), i.e., 1000.

In case the tracking ratio XGS is greater than the greater reference value XGL0 the data bit $d_i$ is considered to start at a time indicated by even milliseconds (0, 2, 4, . . . 2N), i.e., the data bit rising edge is detected as placed at even milliseconds, while in the case the tracking ratio XGS is smaller than the smaller reference value XGL1, the data bit is considered to start at time 1, 3, 5 . . . (2N+1) milliseconds, i.e., odd milliseconds.

Figure 4:
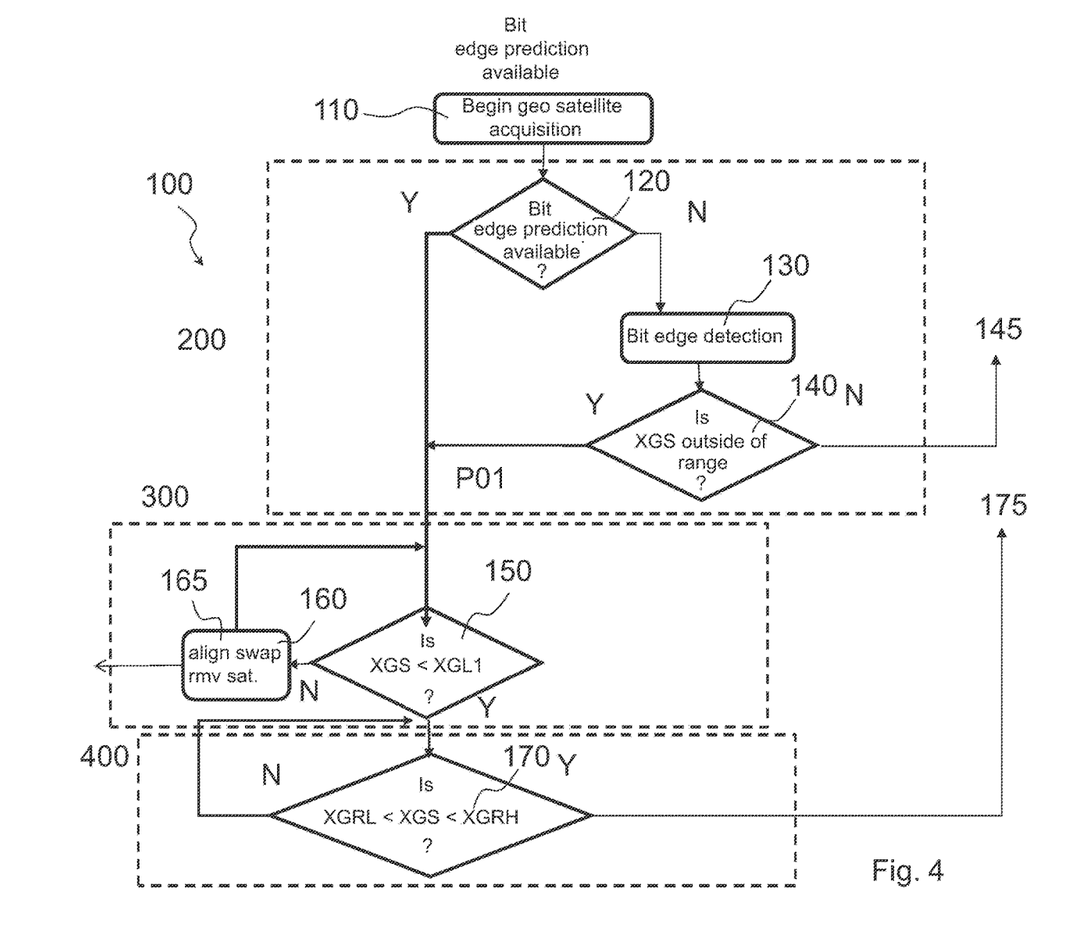
FIG. 4 represents a flow diagram illustrating an embodiment of the method here described.

The positive conclusion of such data bit edge detection phase (a possible embodiment of such phase is represented step 140 in FIG. 4) allows starting an aligned tracking loop using the maximum coherent length of the data bit, or data bit cycle Tc (2 ms).

In case, during the comparison of the ratio XGS to the reference values, it is found that the tracking ratio XGS does not stably charge above the greater reference value XGL0 or below the smaller reference value XGL1 after the designed timeout TTLG, no positive decision is taken and the candidate satellite signal $s_i$ is dropped because not confirmed (step 145 in FIG. 4).

Typical values for the values XGL0, XGL1 are 1200, 883 respectively, with a Probability of False Alarm value Pfa set to be less than a percentual value X % at a number of dB Y of the contribution signal $s_i$ after the timeout TTLG value in milliseconds and a random bit stream assumed at the input.

The Probability of False alarm Pfa is set by way of example to 1%, the number of dB Y to 27 dB, the minimum synchronization timeout TTLG at 600 ms.

The tracking ratio XGS is used also for cross correlation removal and bad alignment recovery.

In the case a data bit edge prediction is available at the receiver for the i-th GEO satellite at the start up (in the embodiment of FIG. 4, this is represented by the verification step 120 which yields an affirmative result), the coherent power accumulations $\overline{POI}$ can be aligned to accumulate starting on such predicted bit boundary and the following millisecond respectively.

The tracking ratio XGS is expected in this case to stably take values above the greater limit reference value XGL0 already since the beginning of the tracking. In this case the aligned tracking will start immediately, skipping the bit edge detection phase with the comparison to the two reference values XGL0, XGL1. This improves the time to lock performance and improves the overall availability of the receiver.

On the other hand, if, after the bit edge detection phase, the tracking ratio XGS tends to values smaller than the smaller reference value XGL1, then this indicates that either a cross correlation is detected or a bad alignment has been retrieved from prediction (bad position start). The method provides then a bad alignment recovery mechanism, which includes first a step swapping the phase assumed as bit boundary. Then, it is verified the carrier to noise density $C/N_0$ value, since bad alignment recovery will be confirmed in practice by a sudden gain in the reported carrier to noise density $C/N_0$ after such change of the bit edge position from the wrong hypothesis to the correct one.

In the case such carrier to noise density $C/N_0$ gain is not achieved after the swapping step, then this means that a true cross correlation has been found, since the correlation loss is the cause of the poor carrier to noise $C/N_0$ estimate. The satellite will be most likely removed autonomously because of weak $C/N_0$ (step 165 in FIG. 4)

Figure 2A:
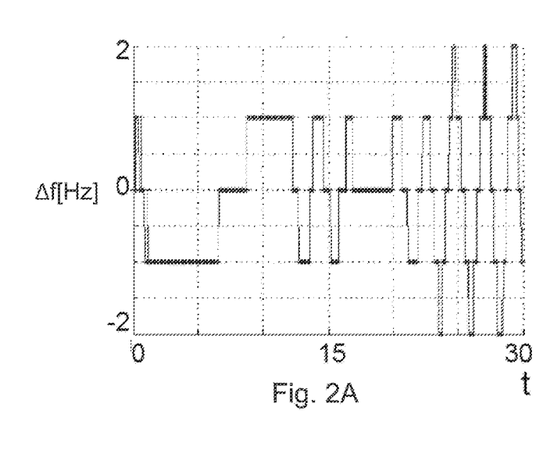
FIG. 2A-2D represents time diagrams of different signals in a receiver during a bad alignment condition according to the method here described.
Figure 2B:
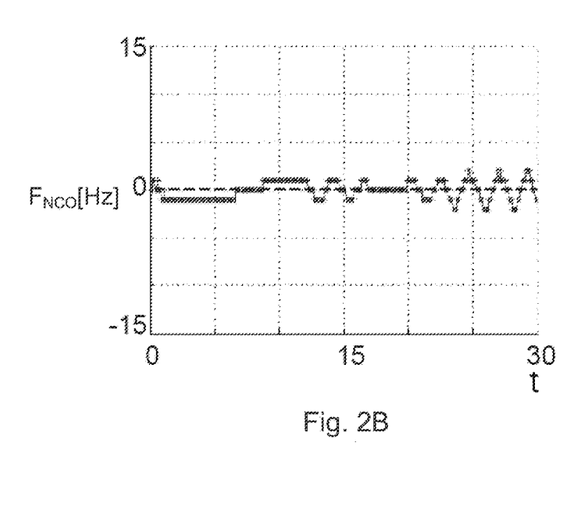
Figure 2C:
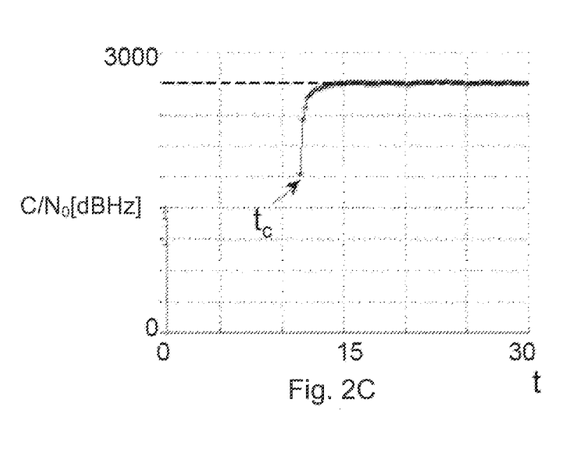
Figure 2D:
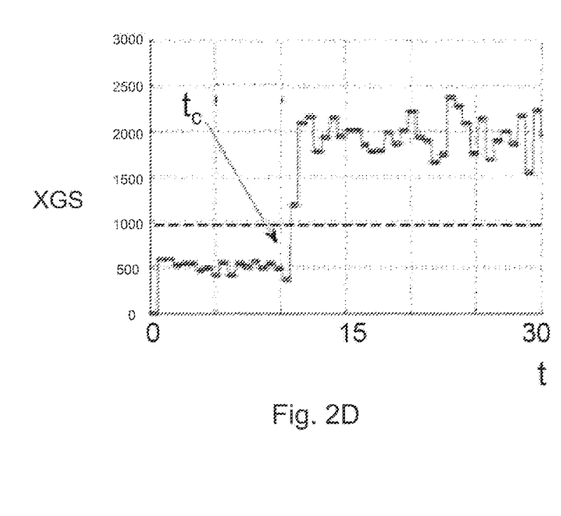

In FIGS. 2A-2D are shown as a function of time t the frequency error Δf which is obtained estimating at the receiver the Doppler shift with a tracking frequency $f_{NCO}$, the tracking performance indicated by such tracking frequency $f_{NCO}$, i.e., the frequency of a numerically controlled oscillator of the receiver tracking the frequency of the signal $s_i$, the carrier to noise density $C/N_0$ estimation and the tracking ratio XGS in a condition in which a bad alignment occurs after bit edge detection. The simulation, which is a simulation of bad alignment, is performed in the hypothesis that the satellite and the receiver do not move one with respect to the other. The tracking ratio XGS is let acting as bad alignment indicator for 10 s of tracking of a BeiDou GEO stationary satellite, assumed with 0 Hz Doppler, 40 dB $C/N_0$ post correlation and an initial bad bit edge. In FIGS. 2C and 2D it is indicated a correction time $t_c$ at which on the basis of the ratio value a bad alignment is detected and the wrong alignment is swapped with the other, correct alignment. As shown in FIG. 2C, which shows the carrier to noise $C/N_0$ estimation, a sharp increase of the carrier to noise density estimation is present at correction time $t_c$, which denotes bad alignment. If this increase is not present at correction time $t_c$, a cross correlation is to be signaled.

The tracking ratio XGS is also used for a RFI removal function. After the positive conclusion of the GEO satellite bit edge identification (both explicit and predicted), it can be useful to continue evaluating the tracking ratio XGS at run time in order to exclude continuous wave RFI entering the tracking loop along the time. Since continuous wave RFI is expected to lack the random data bit alternation, the tracking ratio XGS does not anymore remain locked at a value bigger than the greater reference value XGL0 if a continuous wave RFI enters the GEO satellite tracking loop.

Two further thresholds, an RFI high threshold XGRH and an RFI low threshold XGRL, which define a range within the range defined by the two reference limit values XGL0 and XGL1, in particular strictly across 1000) can be introduced. For instance the RFI high threshold XGRH can be 1050 and the RFI low threshold XGRL 950. If the tracking ratio XGS falls within range defined by such RFI thresholds XGRH, XGRL, this triggers the RFI identification and the satellite exclusion.

Figure 3:
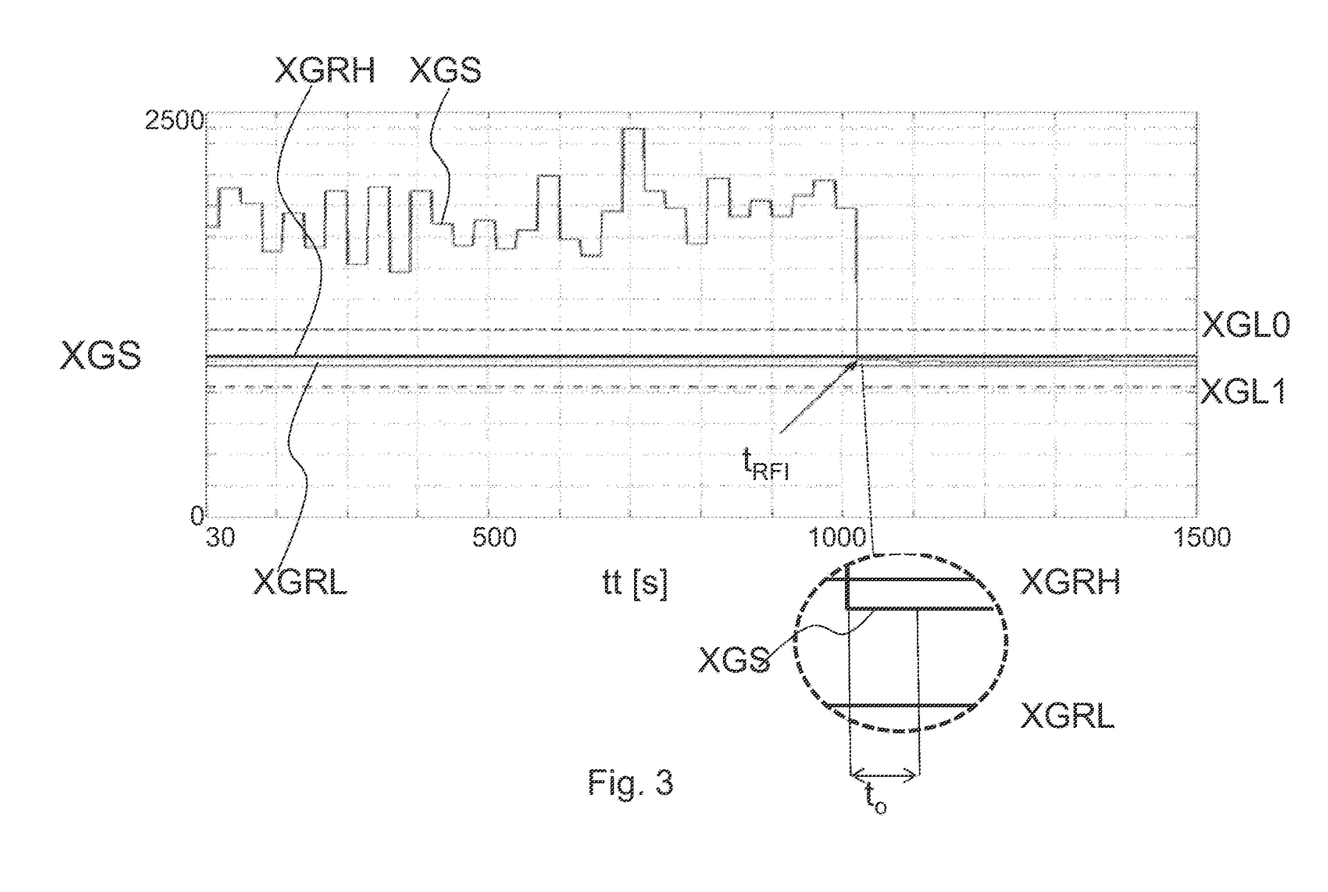
FIG. 3 represents a time diagram representing an operation of RFI detection step during run time of the method here described.

The effectiveness of the method has been confirmed in simulation. In FIG. 3 it is shown a result of a synthetic test on the RFI removal function. The value of the tracking ratio XGS as function of tracking time tt at run time in seconds is shown, over a long period of time, i.e., 1500 seconds, In FIG. 3 are also indicated the greater reference value XGL0, the smaller reference value XGL1, the RFI lower threshold XGRL and the RFI high threshold XGRH. In the test after 1000 s of tracking, a continuous wave RFI enters the tracking channel at time $t_{RFI}$. The sudden absence of data bit in the contribution signal $s_i$ determines that the tracking ratio XGS converges to the constant multiplied value, i.e., 1000, immediately.

By way of example, the satellite can be dropped as RFI because of the tracking ratio XGS falls in the RFI range [XGRL, XGRH] (as embodied for instance in step 174 of the diagram of FIG. 4) if the carrier to noise density $C/N_0$ is bigger than a given threshold value, set to limit Probability of False Alarm Pfa to a given percentage X %.

In FIG. 4 it is shown a flow diagram of an exemplary embodiment of the method for the acquisition of a GEO (Geostationary Earth Orbit) satellite here disclosed. Such method, collectively indicated with the numeric reference 100 takes place at a BeiDou satellite receiver which, in a step 110, begins a geo satellite acquisition, operating on the signal $s_i$ from the i-th satellite, in order to perform a identification phase 200 of the boundary or edge of the data bit $d_i$ in the contribution signal $s_i$.

Once the signal $s_i$ from the i-th satellite is acquired, in a step 120 it is first verified if a prediction of the bit edge is available at the receiver. If in step 120 it is verified that a prediction of the bit edge is available at the receiver, then a step 150 of aligned tracking is directly started using the predicted bit edge, in particularly aligning initial position 101 to the predicted bit edge.

If from step 120 a predicted bit edge is not available, this means that a bit edge detection is necessary and aligned tracking is not yet possible. Therefore a bit edge detection step 130 is performed, forming coherent power accumulations $\overline{P01}$ and $\overline{P12}$ on the basis of unknown alignment hypothesis, as described with reference to FIG. 1, thus calculating the tracking ratio parameter XGS and comparing the tracking ratio XGS to the greater reference value XGL0 and to the smaller reference value XGL1, and in case the tracking ratio XGS is greater than the greater reference value XGL0 the data bit $d_i$ edge is considered to be placed at a time indicated by even milliseconds, while in the case the tracking ratio XGS is smaller than the smaller reference value XGL1, the data bit $d_i$ edge is considered to be placed at time 1, 3, 5 . . . (2N+1) milliseconds, i.e., odd milliseconds. In any case step 130 produces a detected bit edge which is the output of the identification phase 200, supplied to the alignment phase 300. The alignment phase 300 occurs in general at start-up.

After the bit edge detection step 130, prior alignment phase 300, in a verification step 140, it is performed the checking the value of the tracking ratio XGS after a synchronization timeout TTLG of a given number of milliseconds, using the two reference values XGL0 and XGL1, If the tracking ratio XGS falls inside the range defined by the two reference values XGL0 and XGL1, this is interpreted as the result of cross correlation or RFI and an action 145 of dropping the i-th satellite associated to the contribution signal $s_i$ under acquisition is performed.

If the result of step 140 is affirmative, because XGS is outside the range [XGL1, XGL0], the data bit boundary is detected, and, as for the predicted boundary, the power accumulation P01 is aligned to accumulate on correct hypothesis at run time.

Alignment phase 300 starts now passing to alignment tracking step 150.

As indicated previously, the step 150 of aligned tracking includes verifying if the tracking ratio XGS is smaller than the smaller reference values XGL1. In the negative a step 160 of alignment swap is performed, during which, as explained previously, also the carrier to noise density $C/N_0$ is monitored. If the carrier to noise density $C/N_0$ does not rise after the swapping, a cross correlation is diagnosed and the satellite is removed in a step 165. Either the control pass back to step 150.

After the alignment phase 300, i.e., after step 150 indicates for a given time that the tracking ratio XGS is above the smaller reference values XGL1, the receiver enters a run time phase 400, during which operates normally with the acquired contribution signal $S_i$. As mentioned, during this run time phase preferably, as shown in the embodiment of FIG. 4, a step 170 of RFI detection and removal is performed using again the tracking ratio XGS. As indicated previously, such step 170 provides that if the tracking ratio XGS falls within range defined by the RFI high threshold XGRH and the RFI low threshold XGRL and remains within such range definitely for a RFI detection timeout time $t_o$ of, e.g., 1-2 s, this triggers a RFI identification and the satellite exclusion in step 175. In FIG. 3 such RFI detection timeout time $t_o$, being short with respect to the scale of the diagram, is represented in a magnified inset. Block 170 is executed repeatedly during the tracking phase, in order to verify that the ratio XGS it is not stably in the RFI range [XGRL, XGRH] which identifies RFI. When the tracking parameter XGS enters the range [XGRL, XGRH] which identifies RFI for a greater than the RFI detection timeout time $t_o$, the satellite will be dropped because the corresponding signal $s_i$ is interpreted as RFI.

In variant embodiments, the thresholds XGRL, XGRH and/or the RFI detection timeout time $t_o$ can be computed as a function of the carrier to noise density $C/N_0$.

The RFI detection timeout time $t_o$, i.e., the minimum time required for the tracking parameter XGS to be confined inside the RFI range [XGRL, XGRH] to discard the satellite as RFI, can be considered as function of current to noise density $C/N_0$ estimate.

An example of implementation for the RFI exclusion rule at run time is the one in which RFI range [XGRL, XGRH] is assumed as constant (e.g., [950, 1050]) through all the range of carrier to noise density $C/N_0$ but the tracking parameter XGS RFI detection timeout time $t_o$ is set at 1 second for carrier to noise density $C/N_0$ greater than 35 dB, 2s below. This is to guarantee a reasonable constant Probability of False Alarm Pfa for the RFI identification through all the carrier to noise density $C/N_0$ range of tracking.

As mentioned, in principle both the RFI range [XGRL, XGRH] range and the RFI detection timeout time $t_o$ t can be computed as a function of the carrier to noise density $C/N_0$.

For instance, such function can be a proportionality like the following: the lower the carrier to noise density $C/N_0$ value is, as instantaneously measured for the i-th satellite:

the bigger the RFI detection timeout time $t_o$ is set. This in order to wait more time before dropping the satellite interpreting it as true RFI;

the narrower the RFI range [XGRL, XGRH] is set, since in a noisy situation the XGS parameter tends to have value more close to the median, i.e., 1000, even if it is not true RFI, but the signal $s_i$ of a satellite. Narrowing the RFI range avoids triggering the drop for a satellite signal $s_i$ which is simply noisy.

The method according to the various embodiments here described is presents the advantage with respect to previous solutions that it correctly performs the bit edge detection at the beginning of the acquisition to start the tracking phase, in a simple manner, by evaluating a tracking parameter based on the ratio of two power accumulation for the two different positions allowed for GEO signals.

Also, the method allows, by exploiting the same tracking parameter, to individuate cross correlation, prevent bad alignment from initial bad prediction (bad position starts) and avoid tracking RFIs that could enter the tracking loop of GEO satellite already locked along time, i.e., at run time.

Of course, without prejudice to the principle of the embodiments, the details of construction and the embodiments may vary widely with respect to what has been described and illustrated herein purely by way of example, without thereby departing from the scope of the present embodiments, as defined the ensuing claims.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A Global Navigation Satellite System (GNSS) receiver method to acquire a Geostationary Earth Orbit (GEO) satellite belonging to a constellation of satellites of a BeiDou navigation system, comprising:
   receiving a signal carrying a data stream of a given GEO satellite;
   detecting an edge of a data bit in the signal, said detecting including:
      performing a first coherent power accumulation and a second coherent power accumulation for a time length corresponding to a constant data cycle, said first and second coherent power accumulations starting from two respective possible initial positions in the data stream; and
      computing a tracking ratio parameter as a ratio of said first and second coherent power accumulations multiplied by a constant value;
   based on said detecting, synchronizing the given GEO satellite at a start of a locked tracking phase; and
   demodulating said data stream of the given GEO satellite.

2. A method according to claim 1, comprising:
   comparing the tracking ratio parameter to a greater reference value, the greater reference value greater than said constant value;
   comparing the tracking ratio parameter to a smaller reference value, the smaller reference value smaller than said constant value;
   when the tracking ratio parameter is greater than the greater reference value, considering the data bit edge to be placed at a time indicated by even milliseconds; and
   when the tracking ratio parameter is smaller than the smaller reference value, considering the data bit edge to be placed at time indicated by odd milliseconds.

3. A method according to claim 2, comprising:
   when said tracking ratio parameter falls within a range defined by the greater reference value and the smaller reference value, dropping an attempt to acquire the given GEO satellite.

4. A method according to claim 1, comprising:
   during an initialization, preliminarily verifying whether or not a data bit edge prediction is available for the given GEO satellite; and
   when the data bit edge prediction is available, setting the first and second coherent power accumulations to accumulate starting on a predicted bit boundary and a following millisecond, respectively.

5. A method according to claim 2, comprising:
   aligning the first coherent power accumulation corresponding to a first one of the two respective possible initial positions.

6. A method according to claim 2, comprising:
   performing the act of comparing the tracking ratio parameter to the greater reference value and performing the act of comparing the tracking ratio parameter to the smaller reference value after a given synchronization timeout, the given synchronization timeout representing a time to lock the given GEO satellite.

7. A method according to claim 1, comprising:
   verifying whether or not the tracking ratio parameter is smaller than the smaller reference value;
   based on the verifying, swapping a data bit edge prediction; and
   checking whether or not swapping the data bit edge prediction results in a gain in reported carrier to noise density.

8. A method according to claim 2, comprising:
   performing an operation of radio frequency interference (RFI) removal;
   determining whether or not the tracking ratio parameter stably falls for a timeout time within a range defined by a RFI high threshold and a RFI low threshold, wherein the range defined by the RFI high threshold and the RFI low threshold falls within said greater reference value and said smaller reference value; and
   when said tracking ratio parameter falls within the range defined by the RFI high threshold and the RFI low threshold, dropping an attempt to acquire the given GEO satellite.

9. A method according to claim 8, comprising:
   computing at least one of the RFI high threshold, the RFI low threshold and the timeout time as a function of a carrier to noise density of the signal carrying the data stream of the given GEO satellite.

10. A method according to claim 1, wherein said first and second power accumulations are filtered over time so that said first and second power accumulation values tend toward respective average values.

11. A method according to claim 1, wherein the constant value is two times a data bit rate of the signal carrying the data stream of the given GEO satellite.

12. A GNSS receiver arranged to acquire a Geostationary Earth Orbit (GEO) satellite belonging to a constellation of satellites of a BeiDou navigation system, comprising:
    a digital signal processing module arranged to:
       perform a first coherent power accumulation and a second coherent power accumulation for a time length corresponding to a constant data cycle, said first and second coherent power accumulations starting from two respective possible initial positions of an edge of a data bit in a GEO satellite signal carrying a data stream; and
       compute a tracking ratio parameter as a ratio of said first and second coherent power accumulations multiplied by a constant value.

13. A GNSS receiver according to claim 12, wherein the digital signal processing module is arranged to:
    compare the tracking ratio parameter to a greater reference value, the greater reference value greater than said constant value;
    compare the tracking ratio parameter to a smaller reference value, the smaller reference value smaller than said constant value;
    consider the data bit edge to be placed at a time indicated by even milliseconds when the tracking ratio parameter is greater than the greater reference value; and
    consider the data bit edge to be placed at time indicated by odd milliseconds when the tracking ratio parameter is smaller than the smaller reference value.

14. A GNSS receiver according to claim 13, wherein the digital signal processing module is arranged to:
    perform an operation of radio frequency interference (RFI) removal;
    determine whether or not the tracking ratio parameter stably falls for a timeout time within a range defined by a RFI high threshold and a RFI low threshold, wherein the range defined by the RFI high threshold and the RFI low threshold falls within said greater reference value and said smaller reference value; and drop an attempt to acquire the given GEO satellite when said tracking ratio parameter falls within the range defined by the RFI high threshold and the RFI low threshold.

15. A GNSS receiver according to claim 12, wherein the digital signal processing module is arranged to:
    drop an attempt to acquire the given GEO satellite when the tracking ratio parameter falls within a range defined by the greater reference value and the smaller reference value.

16. A GNSS receiver according to claim 12, wherein the digital signal processing module is arranged to:
    verify whether or not the tracking ratio parameter is smaller than the smaller reference value;
    swap a data bit edge prediction based on the verifying; and
    check whether or not swapping the data bit edge prediction results in a gain in reported carrier to noise density.

17. A GNSS receiver according to claim 12, wherein the constant value is two times a data bit rate of the signal carrying the data stream of the given GEO satellite.

18. A Global Navigation Satellite System (GNSS) receiver method to acquire a Geostationary Earth Orbit (GEO) satellite belonging to a constellation of satellites of a BeiDou navigation system, comprising:
    performing a first coherent power accumulation and a second coherent power accumulation for a time length corresponding to a constant data cycle, said first and second coherent power accumulations starting from two respective possible initial positions of an edge of a data bit in a GEO satellite signal carrying a data stream;
    computing a tracking ratio parameter as a ratio of said first and second coherent power accumulations multiplied by 1000;
    comparing the tracking ratio parameter to a greater reference value, the greater reference value being greater than or equal to 1200; and
    comparing the tracking ratio parameter to a smaller reference value, the smaller reference value smaller being less than or equal to 883.

19. A method according to claim 18, comprising:
    considering the data bit edge to be placed at a time indicated by even milliseconds when the tracking ratio parameter is greater than the greater reference value; and
    considering the data bit edge to be placed at time indicated by odd milliseconds when the tracking ratio parameter is smaller than the smaller reference value.

20. A method according to claim 18, comprising:
    dropping an attempt to acquire the given GEO satellite when the tracking ratio parameter falls within a range defined by the greater reference value and the smaller reference value.

* * * * *